United States Patent [19]

Shinomiya

[11] Patent Number: 4,881,586

[45] Date of Patent: Nov. 21, 1989

[54] ALL-TERRAIN PNEUMATIC TIRE

[75] Inventor: Masami Shinomiya, Osaka, Japan

[73] Assignee: The Ohtsu Tire & Rubber Co., Ltd., Osaka, Japan

[21] Appl. No.: 152,308

[22] Filed: Feb. 4, 1988

[30] Foreign Application Priority Data

Feb. 28, 1987 [JP] Japan .................................. 62-45786

[51] Int. Cl.⁴ ............................................. B60C 11/03
[52] U.S. Cl. ............................. 152/209 B; 152/209 R; 152/548
[58] Field of Search ........... 152/209 R, 209 A, 209 B, 152/209 D, 526, 538, 548, 550, 523

[56] References Cited

U.S. PATENT DOCUMENTS

| | | | |
|---|---|---|---|
| 3,675,700 | 7/1972 | Verdier | 152/209 R |
| 3,811,488 | 5/1974 | Duncan | 152/209 R |
| 4,124,052 | 11/1978 | Beauchamp | 152/209 B |
| 4,129,162 | 12/1978 | DeWitt | 152/538 X |
| 4,356,985 | 11/1982 | Yeager et al. | 152/209 R |

FOREIGN PATENT DOCUMENTS 2904939  8/1980  Fed. Rep. of Germany ... 152/209 B

Primary Examiner—Michael W. Ball
Assistant Examiner—Geoffrey L. Knable
Attorney, Agent, or Firm—Sixbey, Friedman, Leedom & Ferguson

[57]  ABSTRACT

The tread of a tire has an on-road pattern formed in its central area and including traction grooves. An off-road pattern is provided at each side of the tread central area, as formed on each tire shoulder. The off-road pattern has lugs and an annular wing adjacent to a curved recessed portion and is positioned radially inward from the bottom of the traction grooves so as to be held out of contact with the surface of the road during on-road operation. The on-road pattern is immersed in off-road terrain with the off-road pattern in contact with the surface of the terrain over an increased area to effectively engage mud, sand or the like.

10 Claims, 6 Drawing Sheets

ALL-TERRAIN PNEUMATIC TIRE

FIELD OF THE INVENTION AND PRIOR ART STATEMENT

The present invention relates to an all-terrain pneumatic tire which is usable on roads (i.e., paved roads and maintained unpaved roads) and also off roads (e.g. in sand, mud or snow, or on unmaintained ground such as glassland) and which is useful, for example, for buggies.

Pneumatic tires are divided generally into those for use on roads and those for use off roads, according to their use.

Although these two types of tires have common properties required of pneumatic tires, they differ in use and are therefore required to have characteristics in conformity with the use.

More specifically, on-road tires must fulfill requirements as to abrasion resistance, road holding property, pattern noise and operation in wet conditions, while those for use off roads need to satisfy requirements as to traction, especially traction in snow, sand and mud, floatation and mud releasability.

Furthermore, on-road pneumatic tires differ from off-road pneumatic tires in tread pattern.

In contact-void ratio, on-road pneumatic tires are 50 to 75%, and the latter type 20 to 35%. (Some tires of the latter type specified for use on snow or dune are 2 to 5%.) Thus, there is a wide difference between the two types.

Off-road pneumatic tires are designed chiefly for use off roads, so that if such tires are used on the road, the tire makes the vehicle feel heavy to steer, gives off a great pattern noise, encounters increased resistance to running and a great side bite (resistance to cornering) and exhibits poor abrasion resistance. Thus, off-road tires are not usable on roads.

On the other hand, on-road pneumatic tires are not usable off roads (especially in sand, mud or snow) because of insufficient floatation and low traction which is further reduced by clogging with mud or snow.

Conventionally, vehicles for use on roads are equipped with on-road pneumatic tires, while those for use off roads are provided with pneumatic tires designed specifically therefor. Accordingly, great difficulties are encountered in using on-road vehicles off roads or off-road vehicles on roads.

U.S. Pat. No. 4,124,052 discloses a highway cross-country tire which has a tread area located centrally of the tire and projecting radially outward thereof, traction grooves formed in the tread area, shoulder walls extending from the tread area each at an acute angle therewith, and circumferentially spaced lugs extending outward from each shoulder wall.

The disclosed tire, despite its own usefulness, has the following problems.

When the tire rolls off a road during driving, i.e., when the tire encounters mud, snow, sand or like soft terrain, the mud, sand or snow under the shoulder walls is forced out sidewise of the tread since the shoulder walls extend at an acute angle, with the result that the shoulder walls encounter difficulty in assuring the tire of sufficient floatation. Moreover, the shoulder walls are likely to permit the tire to be immersed in the terrain to a greater extent to impair the running performance of the vehicle.

The outer peripheral surface of each lug joined to the side end of the tread is positioned on the same plane as the bottom of the traction grooves formed in the tread area. Although the lug will not come into contact with the ground during on-road service before the tire tread is worn or while the wear is not great, the outer surface of the lug contacts the ground to cause trouble to the on-road operation if the tread is worn markedly to diminish the grooves.

It is to be noted that the actual road surface is not a perfect horizontal surface but generally has some irregularities, which cause the tire itself to deform by varying amounts during running. It is therefore likely that the lugs will contact the ground to cause trouble to on-road operation.

OBJECTS AND SUMMARY OF THE INVENTION

The present invention has been accomplished to overcome the foregoing problems heretofore experienced.

More specifically, a first object of the present invention is to provide an all-terrain pneumatic tire having different tire characteristics such as the characteristics of on-road pneumatic tires and those of off-road pneumatic tires.

A second object of the present invention is to provide an all-terrain pneumatic tire which has an annular wing formed on each of its shoulder and adjacent to a curved recessed portion and which is thereby made engageable with sand, mud or the like effectively during off-road operation and given greatly improved floatation.

A third object of the invention is to provide an all-terrain pneumatic tire of the type mentioned in which the outer peripheral surfaces of lugs and the annular wings are positioned radially inward from the bottom of traction grooves in its tread to preclude the contact of the lugs and the annular wings with the ground during on-road operation while permitting the tread to be immersed in the terrain during off-road service and allowing the curved recessed portions to embrace sand, mud or the like therein to give an increased ground contact area to the tire.

Other objects of the invention will become more apparent from the following description with reference to the accompanying drawings.

To fulfill the above objects, the invention provides a tire having the following means.

The tread of the tire has in its central area an on-road pattern including traction grooves, while an off-road pattern is formed at each side of the tread central area, as provided on the shoulder of the tire, the on-road pattern projecting outward beyond the off-road pattern radially of the tire so as to be positioned in contact with the road surface while holding the off-road pattern out of contact with the road surface, the on-road pattern being positionable as immersed in off-road terrain with the off-road pattern in contact with the surface of the terrain. The off-road pattern has lugs and an annular wing adjacent to a curved recessed portion and projecting radially outwardly of the tire. The outer peripheral surfaces of the lugs and the wing are positioned radially inwardly of the bottoms of the traction grooves.

DESCRIPTION OF THE PREFERRED EMBODIMENTS

Figure 1:
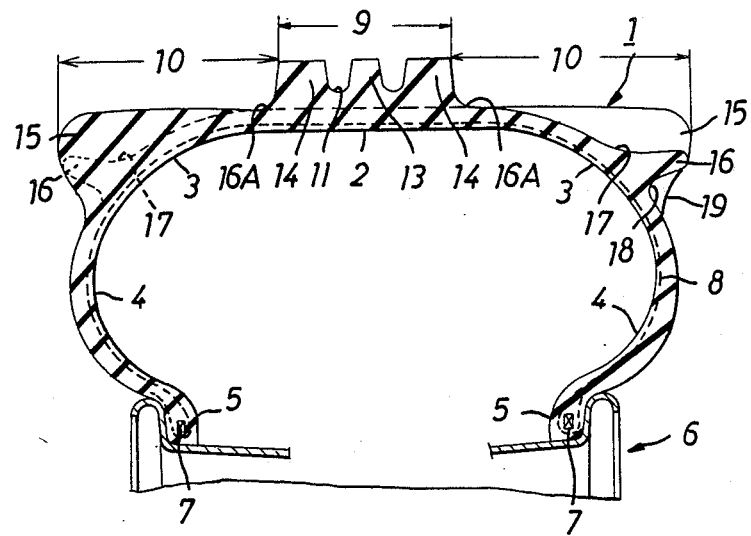
FIG. 1 is a sectional view showing an embodiment of the invention.
Figure 2:
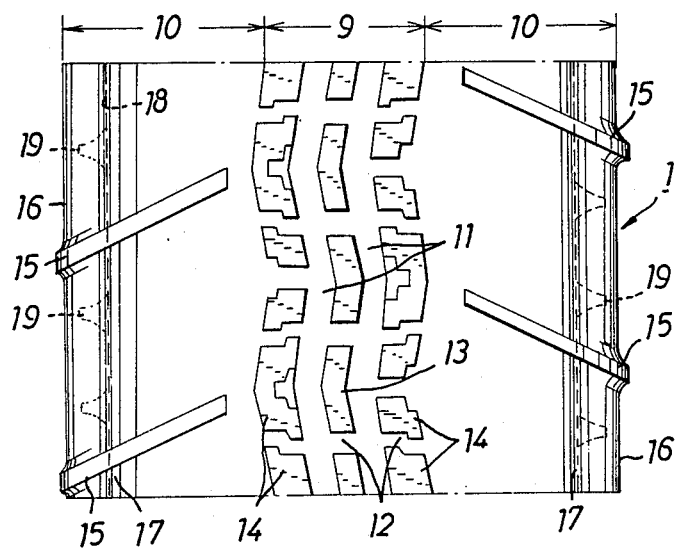
FIG. 2 is a fragmentary plan view of the same.

FIGS. 1 and 2 show a first embodiment of the invention. With reference to these drawings, a pneumatic tire 1 has a tread 2 located centrally thereof, a side wall 4 formed at each side of the tread 2 with a shoulder 3 provided therebetween, and bead portions 5 fitted to a wheel rim 6.

The bead portion 5 has a bead core 7 embedded therein and carcass cords 8 wound on the core 7.

The tire 1 of the present embodiment is slightly flat-shaped.

The tread 2 has in its central area an on-road pattern 9. At each side of the on-road pattern 9, an off-road pattern 10 is formed on the shoulder 3. The on-road pattern 9 has a contact-void ratio (ratio of the ground contact area to the area of bottoms of grooves) of 50 to 75%, while the off-road pattern 10 has a contact void ratio of 20 to 25% (which may be lower, for example, 2 to 5% in some cases).

The on-road pattern 9 of the present embodiment has circumferential grooves 11 and transverse grooves 12 serving as traction grooves, and ribs 13 and lugs 14. The pattern 9, which comprises the ribs and lugs as illustrated, may alternatively comprise ribs or lugs only or blocks.

The off-road pattern 10 has paddle-shaped oblique lugs 15 each extending approximately horizontally (parallel to the tire axis) from a curved portion 16A at the base of the lug 14 of the on-road pattern 9. The paddles 15 of the off-road patterns 10 are formed on the opposite shoulders 3 in a staggered arrangement.

According to the present embodiment, the off-road pattern 10 further has a wing 16 adjacent to a curved recessed portion 17 and provided at the boundary between the outer surface of the shoulder 3 and the outer surface of the side wall 4. The wing 16 extends endlessly circumferentially of the tire in an annular form. The lugs 15 are formed on the wing 16.

A circumferential groove 18 is formed along the wing 16 at the radially inward side thereof to diminish the amount of material needed. Circumferentially spaced ribs 19 are formed in the groove 18 for preventing the wing 16 from deforming radially inward.

The annular wing 16 has an outer peripheral surface positioned radially inwardly of the bottoms of the traction grooves 11 and 12. The outer surfaces of the lugs 15 are also positioned radially inwardly of the groove bottoms. Further the lugs 15 and the wings 16 are positioned within the maximum width of the tire.

Figure 3:
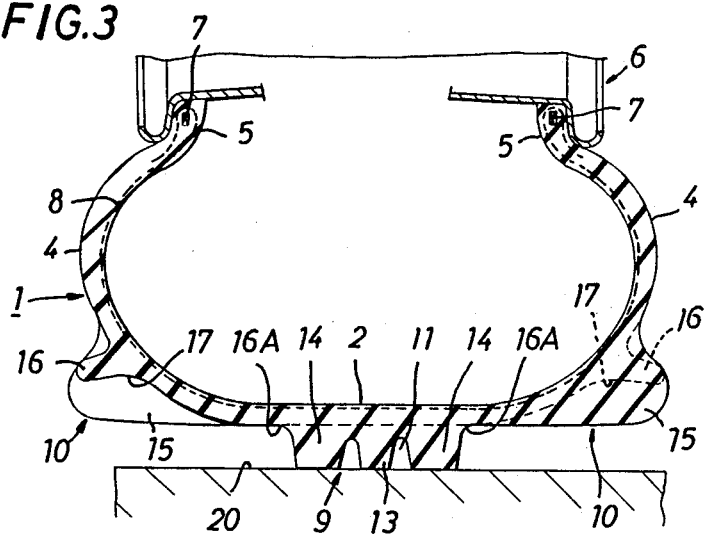
FIG. 3 is a sectional view showing the same during on-road operation.
Figure 4:
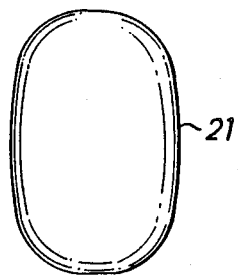
FIG. 4 is a diagram showing an impression of the same on the road surface during on-road operation.
Figure 5:
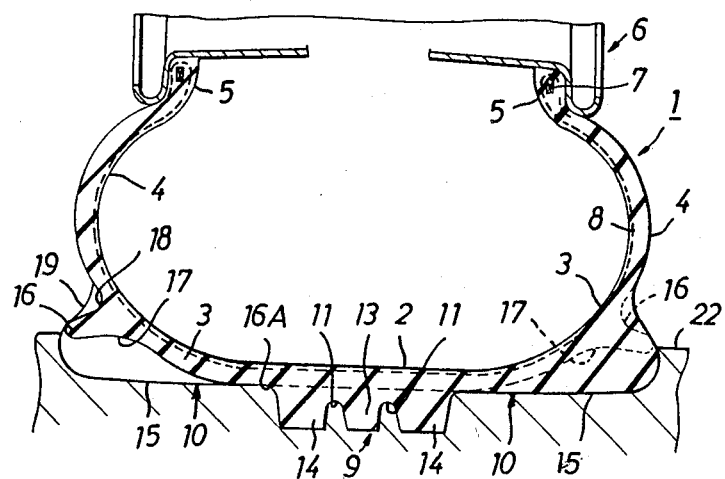
FIG. 5 is a sectional view showing the same during off-road operation.

The on-road pattern 9 projects radially outward beyond the off-road pattern 10 so as to be positioned in contact with the surface 20 of a road while holding the off-road pattern 10 out of contact with the road surface 20 as seen in FIG. 3, when the tire is used on the road. FIG. 4 shows an impression 21 of the tire during the on-road service. Even if the road surface 20 has irregularities deforming the tire, the lugs 15 and the wings 16 are held out of contact with the surface.

This serves to minimize the resistant to running, pattern noise (beat), etc., permitting the tire to contact the road over a diminished area and assuring ease of steering.

During rolling on the road surface 20, the carcass 8, air pressure, etc. support the on-road pattern 9, preventing the pattern from deforming radially inward.

Figure 6:
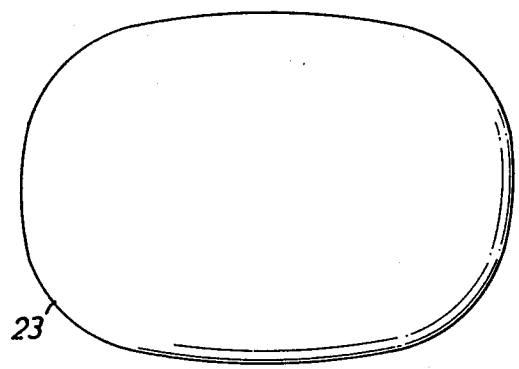
FIG. 6 is a diagram showing an impression of the same on the surface of terrain during off-road operation.

When the tire rolls along in off-road terrain 22, the on-road pattern 9 is immersed in the terrain 22, with the off-road patterns 10 in contact with the surface of the terrain 22 as shown in FIG. 6, with the result that the tire is in contact with the ground over a wide area as indicated at 23 in FIG. 6.

In this case, the curved recessed portions 17 alongside the wings 16 embrace or surround and hold soft earth, snow or the like, reducing the ground contact pressure and permitting the entire tread 2 and the shoulders to contribute to floatation. Moreover, the tire is operable free of clogging with mud or snow and thereby assured of effective traction.

Figure 7:
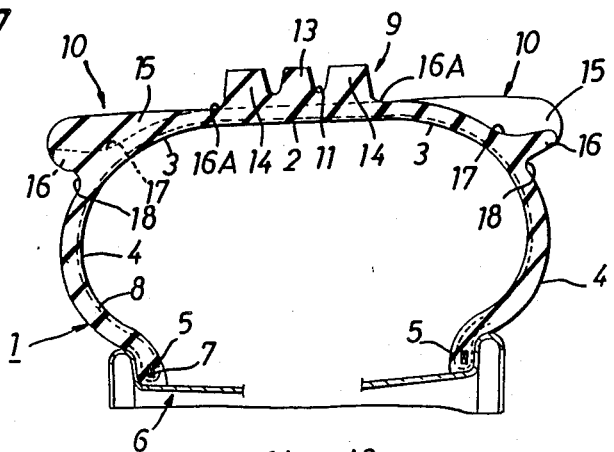
FIG. 7 is a sectional view showing a second embodiment.

FIG. 7 shows a second embodiment, i.e. a tire 1, which has no rib 19 in the circumferential groove 18 unlike the first embodiment (FIG. 1). This serves to reduce the amount of material needed.

The wing 16 of the second embodiment is made rigid so as not to readily deform radially inward.

Figure 8:
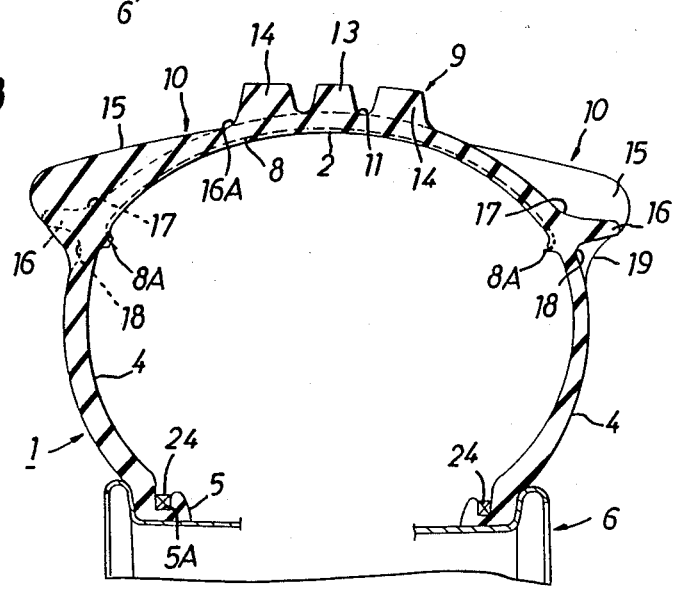
FIG. 8 is a sectional view of a third embodiment.

FIG. 8 shows a third embodiment which is more rounded than the first and second embodiments in cross section. Paddle-shaped lugs 15 are inclined in an arcuate form radially inward as they extend axially outwardly of the tire. Carcass cords 8 are terminated as at 8A at the radially inner end of each shoulder 3. A circumferential groove 5A is formed in each bead portion 5 on the inner side thereof, with a nonstretchable ring 24 fitted in the circumferential groove 5A.

Accordingly, the third embodiment is a tubeless tire. Under the internal pressure of the tire, the ring 24 fitted in each circumferential groove 5A holds the outer periphery of the bead portion 5 in sealing contact with the rim 6 to prevent leakage of air.

Figure 9:
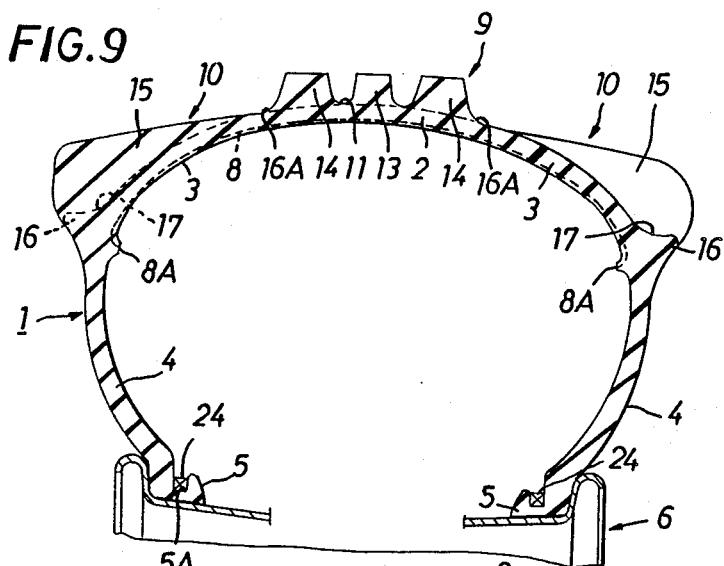
FIG. 9 is a sectional view of a fourth embodiment.

FIG. 9 shows a fourth embodiment which, unlike the third embodiment of FIG. 3, has no circumferential groove 18 alongside the wing 16. With the exception of this feature, this embodiment is the same tubeless tire as the third embodiment.

Figure 10:
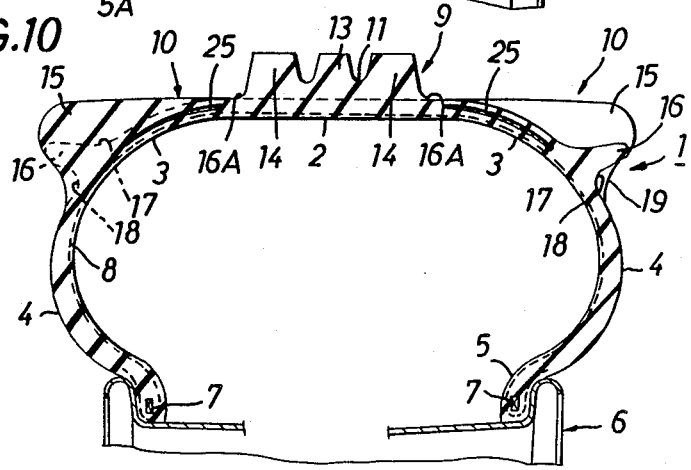
FIG. 10 is a sectional view of a fifth embodiment.

FIG. 10 shows a fifth embodiment wherein each shoulder 3 has a breaker 25 as will be apparent from comparison with FIG. 1.

Figure 11:
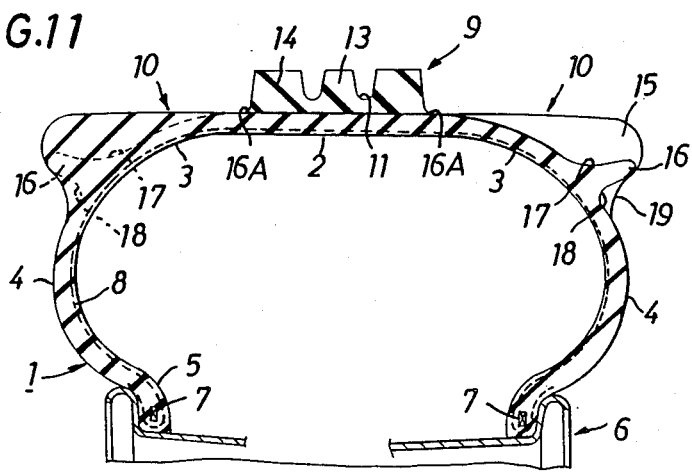
FIG. 11 is a sectional view of a sixth embodiment.

FIG. 11 shows a sixth embodiment wherein the tread rubber, i.e. the rubber material forming the on-road pattern 9, has higher abrasion resistance than the rubber material of the tire main body.

Figure 12:
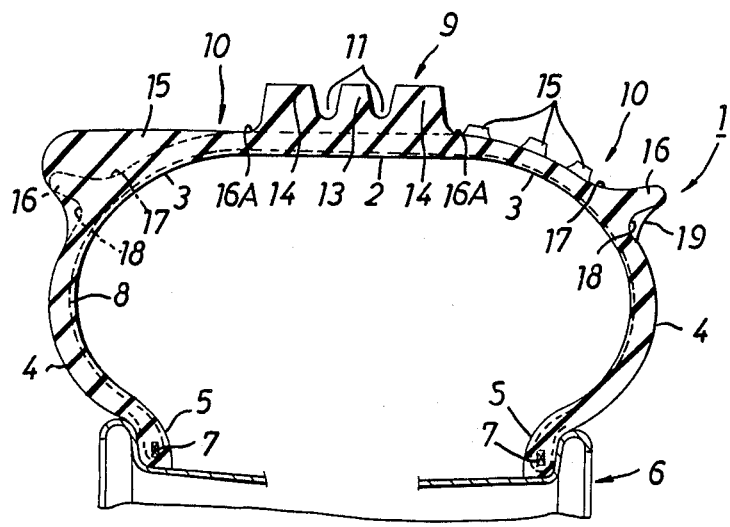
FIG. 12 is a sectional view of a seventh embodiment.
Figure 13:
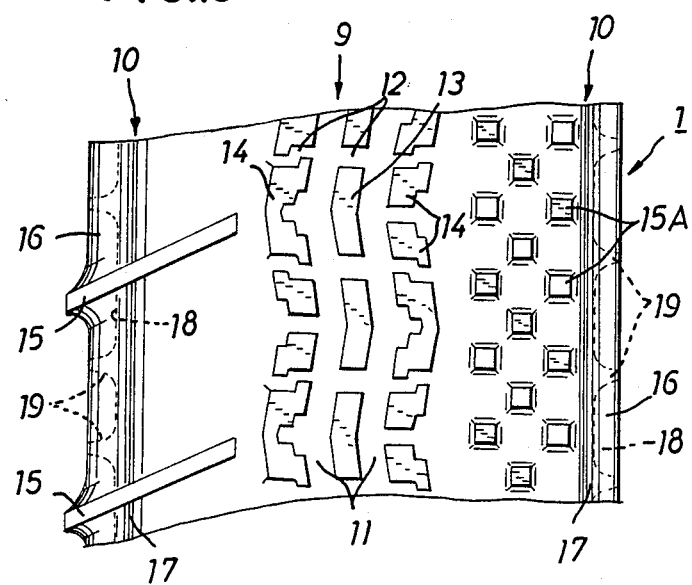
FIG. 13 is a fragmentary plan view of FIG. 7.

FIGS. 12 and 13 show a seventh embodiment. All the foregoing first to sixth embodiments are symmetrically shaped at its opposite sides in tire cross section, whereas one of opposite off-road patterns 10 of the seventh embodiment comprises paddle-shaped lugs 15. The other pattern 10 comprises block lugs 15A.

When the tire 1 of the seventh embodiment is to be attached, for example, to a buggy, the side of the tire having the off-road pattern 10 of paddle-shaped lugs 15 is positioned out, with the other side inward, whereby the vehicle is prevented from being spattered with earth, sand or the like to the greatest possible extent.

Figure 14:
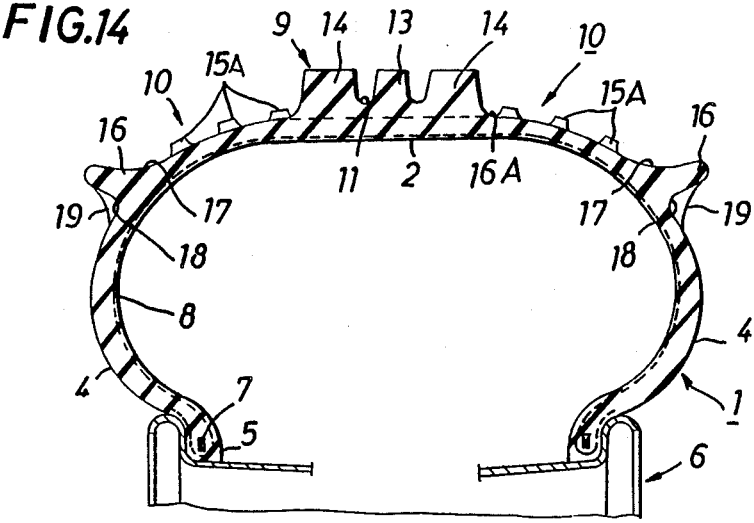
FIG. 14 is a sectional view of an eighth embodiment.

FIG. 14 shows an eighth embodiment, wherein each of opposite off-road patterns 10 comprises block lugs 15A. The pattern has a contact-void ratio of about 2 to about 3%.

Figure 15:
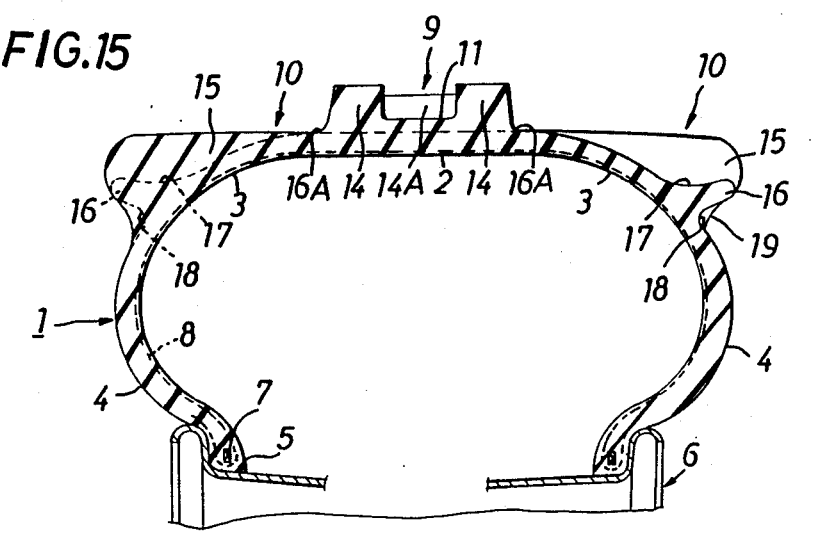
FIG. 15 is a sectional view of a ninth embodiment.
Figure 16:
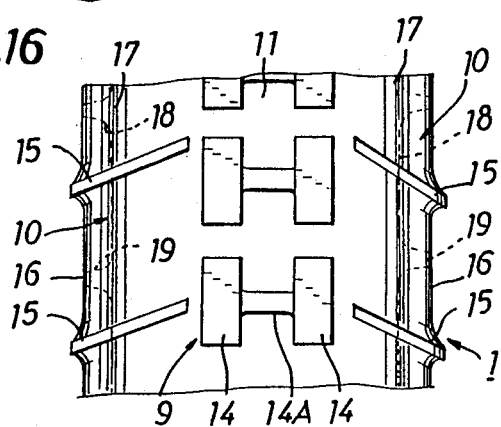
FIG. 16 is a fragmentary plan view of FIG. 15.

FIGS. 15 and 16 show a ninth embodiment, wherein the on-road pattern 9 has circumferentially spaced pairs of opposite axially spaced lugs 14 that are interconnected by a transverse rib 14A of lower height than the lugs 14. When the tire encounters the ground of conditions intermediate between the road and off-road terrain (e.g. on a muddy road), the above structure enables the vehicle to run over the ground smoothly.

Throughout the drawings showing the first to ninth embodiments, like parts are designated by like reference numerals. Two or at least three of these embodiments are usable in combination.

When the all-terrain pneumatic tire of the present invention is used on the road surface 20, the on-road pattern 9 in the central area of the tread 2 is brought into contact with the road surface, with the off-road patterns 10 out of contact with the road surface. This minimizes the running resistance, pattern noise, etc., making the vehicle easy to steer.

More specifically, the outer surfaces of the lugs 15 and the annular wings 16 are positioned radially inwardly of the bottoms of the traction grooves 11, 12 in the tread 2, so that when the tire rolls on the road surface 20, the lugs 15 and the wings 16 are held out of contact with the road surface even if the tread is worn to some extent. Consequently, the running resistance, pattern noise, etc. can be minimized.

When the tire of the invention rolls along in off-road terrain 22, the on-road pattern 9 is immersed in the terrain, with the off-road patterns 10 in contact with the surface of the terrain, enabling the entire tread 2 and the shoulders 3 to contribute to floatation and rendering the tire less prone to clogging with mud, snow or the like, hence effective traction. Moreover, the annular wings 16 formed adjacent the curved recessed portions 17 embrace mud, snow or the like to assure the tire of great floatation and improved running performance.

The lugs 15 of the off-road pattern 10, when in the form of a thin plate (paddle-shaped), are less likely to collapse sand, snow or the like in the terrain, consequently affording correspondingly enhanced traction.

Accordingly, the tire of the present invention is usable on roads and also off roads without trouble and is therefore advantageous to use in various vehicles including buggies.

What is claimed is:

1. An all terrain pneumatic tire having a central circumferential area with a tread pattern thereon for on-road service comprising traction grooves and having an off-road tread pattern on both sides of the central area, said off-road pattern comprising a plurality of lugs formed on each shoulder of said tire, wherein said tread pattern for on-road service is projected radially outward further than the off-road pattern so that the tread pattern for on-road service is used during on-road service while the off-road pattern is kept out of contact with the road, and wherein during off-road service, the tread pattern for on-road service is immersed in the ground and the off-road pattern is subjected to contact with the ground; said lugs of said off-road pattern projecting generally axially of the tire and said lugs formed to be radially inward of groove ends at the bottoms of said traction grooves to keep the lug outer surfaces from contact with the road in on-road service during the entire period of wear of the tread pattern for on-road service, said off-road pattern further having an annular wing which extends circumferentially along the tire between adjacent lugs, wherein a curved recess is formed facing generally outwardly of said tire circumferentially adjacent each said wing between said lugs, so that said curved recess and said lugs together form a means for surrounding and holding soft material that otherwise would be displaced towards the tire sides during off-road service to enhance tire flotation, wherein a circumferential surface of each wing is located radial-heightwise at an intermediate height of the lugs and is located to be inward of the groove ends of said traction grooves.

2. A tire defined in claim 1, wherein the tread pattern for on-road service comprises blocks which are separated by said traction grooves including circumferential grooves and transversal grooves, and the lugs of the off-road pattern are wider in the transverse cross-section of the tire than said annular wings extend generally axially of the tire and parallel with each other.

3. A tire as defined in claim 1, wherein each annular wing has at a reverse side opposite to said curved recess a circumferential groove formed along the entire length of the wing, and an outermost edge of the wing and the lugs, in transverse cross-sectional view of the tire, are positioned within the entire width of the tire.

4. A tire as defined in claim 3, wherein the circumferential groove formed on the reverse side of the annular wing is reinforced by ribs circumferentially spaced along the entire length of the circumferential groove.

5. A tire as defined in claim 1, wherein a pair of bead cores are connected by carcass cords including outer faces that are protected by a pair of breakers provided only at the two shoulders.

6. A tire as defined in claim 1, wherein the tire is of a tubeless variety and including carcass cords provided at the central circumferential area and two shoulders, and has two ends located each at a position to be opposite to the annular wing in the two shoulders.

7. A tire as defined in claim 2, wherein the tread pattern for on-road service has a contact-void ratio of 50 to 75% and the off-road pattern has a contact-void ratio of 20 to 35%.

8. A tire as defined in claim 2, wherein the blocks comprises in the tread pattern for on-road service are made of a rubber material which is more wear-resistant than the remaining tire body.

9. A tire as defined in claim 1 wherein each lug of the off-road pattern is radially inwardly inclined in an arcuate form as it extends axially outwardly of the tire and has an outer end joined to the outer periphery of the wing.

10. A tire as defined in claim 1 wherein the on-road pattern has circumferentially spaced pairs of axially spaced lugs that are interconnected by a transverse rib of a lower height than the lugs.

* * * * *